United States Patent
Blache et al.

(10) Patent No.: US 12,447,505 B2
(45) Date of Patent: Oct. 21, 2025

(54) METHOD FOR FEEDING PARCELS ONTO A SORTING CONVEYOR USING A GRIPPER ROBOT WITH SUCTION CUPS AND AN INTEGRATED CAMERA

(71) Applicant: SOLYSTIC, Bagneux (FR)

(72) Inventors: Richard Blache, Lemps (FR); Thierry Brisson, Mercurol Veaunes (FR); Fabien Devise, Valence (FR); Jean-Marc Roux, Chateauneuf-sur-Isere (FR)

(73) Assignee: Solystic, Bagneux (FR)

( * ) Notice: Subject to any disclaimer, the term of this patent is extended or adjusted under 35 U.S.C. 154(b) by 0 days.

(21) Appl. No.: 18/716,287

(22) PCT Filed: Sep. 29, 2022

(86) PCT No.: PCT/EP2022/077159
§ 371 (c)(1),
(2) Date: Jun. 4, 2024

(87) PCT Pub. No.: WO2023/126085
PCT Pub. Date: Jul. 6, 2023

(65) Prior Publication Data
US 2025/0033086 A1 Jan. 30, 2025

(30) Foreign Application Priority Data
Dec. 28, 2021 (FR) .................................. 2114578

(51) Int. Cl.
*B07C 1/06* (2006.01)
*B25J 9/00* (2006.01)
(Continued)

(52) U.S. Cl.
CPC ............... *B07C 1/06* (2013.01); *B25J 9/0093* (2013.01); *B25J 9/1697* (2013.01); *B25J 15/0616* (2013.01)

(58) Field of Classification Search
CPC .... B25J 9/0093; B25J 9/1698; B25J 15/0616; B07C 1/06
See application file for complete search history.

(56) References Cited

U.S. PATENT DOCUMENTS 9,333,649 B1 * 5/2016 Bradski .................. G06V 20/10
11,624,710 B2 * 4/2023 Yoo ..................... G01N 21/8851
356/639

(Continued)

FOREIGN PATENT DOCUMENTS

WO 2015032402 A1 3/2015

OTHER PUBLICATIONS

Search Report, Application No. FR 2114578, dated Jul. 29, 2022, 2 pages.

(Continued)

*Primary Examiner* — Joseph C Rodriguez
(74) *Attorney, Agent, or Firm* — Falcon Rappaport & Berkman LLP

(57) ABSTRACT

The invention relates to a method for feeding unsorted parcels (1) conveyed on a feed conveyor onto a sorting conveyor, wherein a first camera arranged above the feed conveyor forms a digital image of the unsorted parcels, a control-and-monitoring unit identifies a parcel to be separated, which parcel has a gripping face at the top of same which is not covered by any other parcel in the digital image of the unsorted parcels, the control-and-monitoring unit being configured to servo-control a gripper robot (6), which comprises a gripper hand (9) with a palm (10) from which suction cups (11) extend, so as to pick up the parcel to be (Continued)

separated identified in the digital image and deposit it on the sorting conveyor.

4 Claims, 2 Drawing Sheets

(51) Int. Cl.
    *B25J 9/16*     (2006.01)
    *B25J 15/06*     (2006.01)

(56) References Cited

U.S. PATENT DOCUMENTS

| | | | |
|---|---|---|---|
| 11,624,829 B2* | 4/2023 | Dasika | A01B 69/001 |
| | | | 356/4.01 |
| 11,937,798 B2* | 3/2024 | Shelton, IV | A61B 17/3474 |
| 2013/0096713 A1 | 4/2013 | Takizawa et al. | |
| 2018/0345324 A1* | 12/2018 | Hillerich, Jr. | B07C 5/3422 |
| 2019/0344974 A1* | 11/2019 | Wicks | B65G 47/914 |
| 2021/0299706 A1* | 9/2021 | Filler | B07C 5/3416 |
| 2022/0055071 A1* | 2/2022 | Sharma | B07C 5/342 |

OTHER PUBLICATIONS

International Search Report, Application No. PCT/EP2022/077159, mailed Jan. 19, 2023, 3 pages.

* cited by examiner

[Fig. 1]
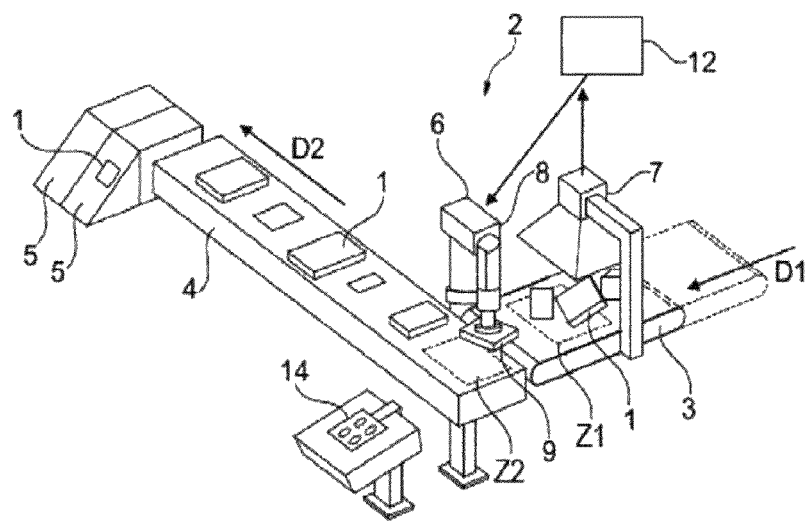
[Fig. 2]
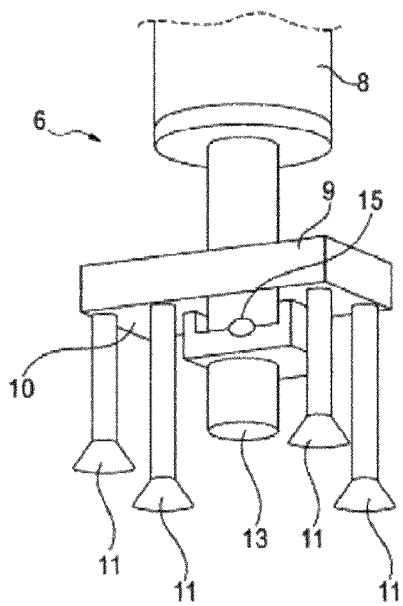

[Fig. 3]
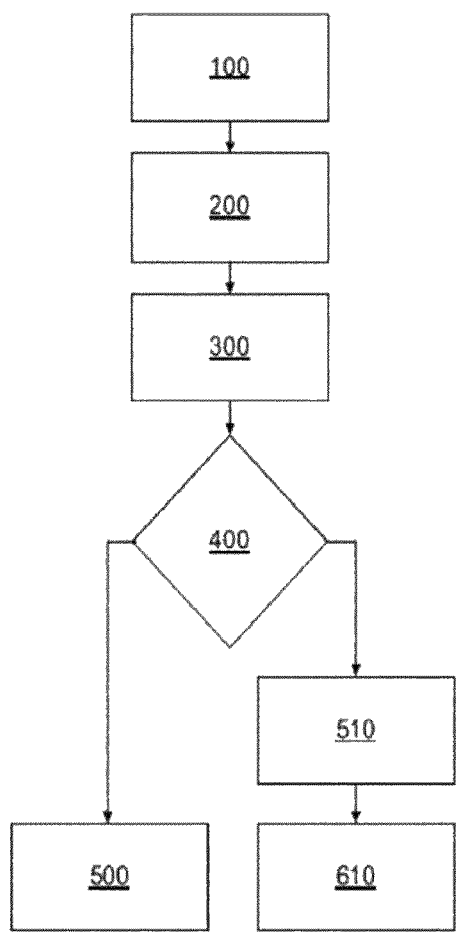

METHOD FOR FEEDING PARCELS ONTO A SORTING CONVEYOR USING A GRIPPER ROBOT WITH SUCTION CUPS AND AN INTEGRATED CAMERA

TECHNICAL FIELD

The invention relates to the field of parcel sorting and more particularly to a method for feeding parcels onto a sorting conveyor from unsorted parcels conveyed on a feed conveyor, wherein a first camera arranged above the feed conveyor forms a digital image of the unsorted parcels, a control-and-monitoring unit identifies a parcel to be separated, which parcel has a gripping face at the top of same which is not covered by any other parcel in the digital image of the unsorted parcels, the control-and-monitoring unit being configured to servo-control a suction cup gripper robot which comprises a gripper hand with a palm from which suction cups extend, so as to pick up by suction said parcel to be separated identified in the digital image and deposit it on the sorting conveyor.

PRIOR ART

Today's logistics platforms use parcel sorting systems designed to automatically feed parcels to sorting conveyors, such as the system described in patent EP3041615.

This type of facility generally comprises a camera positioned above a feed conveyor, capable of forming a digital image of the unsorted parcels.

This type of installation also includes a suction-cup gripper robot comprising a gripper hand with a palm from which the suction cups extend, which, under the control of a control-and-monitoring unit, is able to grasp a parcel to be separated from the unsorted parcels and move it onto the sorting conveyor.

When the gripper robot moves the parcel to be separated onto the sorting conveyor, the top face of the parcel, which is also the gripping face by which the parcel is picked up by the gripper robot, often has no sorting information.

The sorting information is generally affixed to only one side of the parcel, and it is essential that it be visible on the top side of the parcel to enable it to be detected when it is conveyed on the sorting conveyor.

Thus, if the sorting information is not visible on the top face of the package, the package is turned over manually to show the sorting information on top. This repetitive, non-ergonomic task slows down the sorting rate considerably.

DISCLOSURE OF THE INVENTION

The object of the present invention is an automated process for feeding parcels onto a sorting conveyor, helping to solve the above-mentioned problems.

To this end, the invention relates to a method for feeding parcels onto a sorting conveyor from unsorted parcels conveyed on a feed conveyor, wherein a digital image of the unsorted parcels is formed with the aid of a first camera arranged above the feed conveyor, a parcel to be separated presenting a gripping face on the top of the parcel not covered by any other parcel in said digital image of the unsorted parcels is identified with the aid of a control-and-monitoring unit, said control-and-monitoring unit being configured to servo-control a suction cup gripper robot comprising a gripper hand with a palm from which said suction cups extend so as to grasp by suction said parcel to be separated identified in the digital image and to deposit it on the sorting conveyor, characterized in that when said gripper robot is above said parcel to be separated and before gripping it, a digital image of the gripping face of said parcel to be separated is formed by means of a second camera arranged in the palm of the hand between the suction cups of said gripper robot, and in that the control-and-monitoring unit is configured to identify the presence or absence of an indication of the presence of sorting information in said digital image of the gripping face of the parcel and to servo-control the gripper robot in order respectively to move the parcel from the feed conveyor directly onto the sorting conveyor or to deposit the parcel from the feed conveyor onto a parcel turning device designed to turn over and deposit the parcel onto the sorting conveyor.

The method according to the invention may have the following specific features:
  when the digital image of the parcel to be separated is formed by the second camera, the separated parcel is briefly illuminated by means of a pulsed lighting system controlled by the control-and-monitoring unit and arranged in the palm of the hand between the suction cups and around the camera of said gripper robot;
  the identification of the presence of an indication of sorting information is deduced by the control-and-monitoring unit from the direct detection of a destination address or from the detection of a graphic indication of the presence of a destination address on said gripping face, such as a commercial logo.

The idea behind the invention is to detect the presence or absence of an indication of sorting information on the gripping face of the parcel to be separated, before the parcel is injected onto the sorting conveyor, so as to automatically turn the parcel over when it is deposited on the sorting conveyor and thus facilitate the processing of the parcel in the sorting process.

The idea is also to carry out this detection when the gripper robot is moving to pick up the parcel to be separated, and more particularly when the first camera is directly above and as close as possible to the parcel to be separated.

This provides a better-quality digital image, making it easier to detect the presence of sorting information, usually not visible with the first camera located above the unsorted parcels.

The aim of the invention is also to improve the speed and efficiency of parcel sorting, while minimizing the need for non-ergonomic, repetitive manual tasks such as turning parcels over and moving them from one conveyor to another.

BRIEF DESCRIPTION OF THE DRAWINGS

The present invention will be better understood, and other advantages will become apparent on reading the detailed description of the embodiment provided by way of non-limiting example and shown by the appended drawings, in which:

FIG. 1 is a schematic representation of a sorting facility for carrying out the method of the invention;

FIG. 2 is a schematic side view of part of a suction-cup gripper robot with a camera integrated into the gripper robot to carry out the method of the invention;

FIG. 3 is a diagram illustrating the method according to the invention.

DETAILED DESCRIPTION OF THE INVENTION

The method for sorting parcels 1 according to the invention refers to a sorting facility 2 as shown in [FIG. 1], comprising a feed conveyor 3 designed to move the unsorted parcels 1 along a first conveying direction D1, a sorting conveyor 4 designed to convey the parcels 1 along a second conveying direction D2 to suitable sorting outlets 5 and a gripper robot 6 designed to move the parcels 1 one by one from the unsorted parcels 1 from the feed conveyor 3 onto the sorting conveyor 4.

By parcel 1, we mean any type of item usually sorted in postal sorting centers or logistics platforms, such as Small Import Packages, also known as PPI.

As shown in [FIG. 1], a camera 7 is arranged above the feed conveyor 3, and in this case at a downstream end of the feed conveyor 3 with respect to the first conveying direction D1.

Here, the camera 7 has a field of view enabling it to form a digital image of the unsorted parcels 1 corresponding to a gripping zone Z1 in which the parcels 1 can be picked up by gripper robot 6.

The gripper robot 6, shown in [FIG. 2], includes a movable arm 8 at the end of which is mounted a gripper hand 9 with a palm 10 from which suction cups 11 extend.

The gripper robot 6 is specially designed to pick up parcels 1 by suction creating a vacuum in the suction cups 11.

Once the parcel 1 has been sucked up by the suction cups 11, the hand 9 is moved by the arm 8 to be positioned above the sorting conveyor 4.

The parcels 1 are then deposited on a deposit zone Z2 by simply stopping the suction, here at an upstream end of the sorting conveyor 4. Each parcel 1 of the unsorted parcels 1 on the feed conveyor 3 is thus injected onto the sorting conveyor 4 in series.

The sorting system 2 also includes a control-and-monitoring unit 12 configured to identify, in the digital image of the unsorted parcels 1, a parcel 1 to be separated having a gripping face on the top of the parcel 1 not covered by any other parcel 1.

In response to this identification, the control-and-monitoring unit 12 controls the gripper robot 6 to pick up and move a parcel 1 onto the sorting conveyor 4, and more specifically to control its movement between the pick-up zone Z1 and the set-down zone Z2 and the suction in the suction cups 11.

The gripper robot 6 is also equipped with a second camera 13 arranged in the palm 10 of the hand 9 of the gripper robot 6 between the suction cups 11, designed to form a digital image of the gripping face of the parcel 1 to be separated before it is gripped by the suction cups 11.

The control-and-monitoring unit 12 is also configured to identify the presence or absence of sorting information in the digital image of the gripping face of the parcel 1 and to servo-control the gripper robot 6.

Here, the identification of the presence of sorting information is deduced by the control-and-monitoring unit 12 from the direct detection of a destination address or from the detection of a graphic indication of the presence of a destination address on said gripping face, such as a commercial logo.

Destination address also means distribution address or postal address.

This identification of the sorting information is carried out when the gripper robot 6 is above the parcel 1 to be separated, opposite its gripping face.

Thus, in the presence of the sorting information, the control-and-monitoring unit 12 is configured to control the gripper robot 6 to move the parcel 1 to be separated directly onto the sorting conveyor 4, and in the absence of the sorting information to deposit the parcel 1 from the feed conveyor 3 onto a parcel 1 turning device 14, itself designed to turn over and deposit the parcel 1 onto the sorting conveyor 4.

The gripper robot 6 is also equipped with a pulsed lighting system 15 controlled by the control-and-monitoring unit 12, designed to briefly illuminate the unsorted parcel 1 when the digital image of the parcel 1 to be separated is formed by the second camera 13. The lighting system 15 is advantageously arranged in the palm 10 of the hand 9 between the suction cups 11 and around the second camera 13 so as not to alter the field of vision of the second camera 13 or the gripping capacity of the suction cups 11.

The steps of the method according to the invention are summarized in the diagram of [FIG. 3] wherein, in step 100, the digital image of the unsorted parcel 1 is formed by the first camera 7; in step 200, the control-and-monitoring unit deduces a parcel to be separated from the image of the unsorted parcel 1, and servo-controls the gripper robot 6 to position it opposite the gripping face of the parcel 1; in step 300, the digital image of the parcel 1 to be separated is formed by the second camera 13; in step 400, the control-and-monitoring unit 12 deduces the presence or absence of sorting information; in step 500, if sorting information is present, the control-and-monitoring unit 12 controls the gripper robot 6 to move the parcel 1 to be separated directly onto the sorting conveyor 4; in step 510, if no sorting information is present, the control-and-monitoring unit 12 controls the gripper robot 6 to move the parcel 1 to be separated onto a turning device 14: in step 610, the turning device 14 turns the parcel 1 180° directly onto the sorting conveyor 4.

Such a parcel sorting method according to the invention implemented in a sorting facility 1 described above will improve sorting capacity by optimizing the chances of having the gripping face of the parcel 1 to be separated with an indication of presence of sorting information. Detecting the presence of sorting information on the parcel to be separated while the gripper robot 6 is moving, and just before the parcel 1 is gripped, reduces the sorting process time and floor space requirements of the facility, by eliminating operator access to the machine for this type of operation.

It goes without saying that the present invention is not limited to the embodiment disclosed above, and is capable of undergoing modifications without departing from the scope of the invention.

What is claimed is:

1. A method for feeding parcels onto a sorting conveyor from unsorted parcels conveyed on a feed conveyor, comprising:

forming a digital image of the unsorted parcels is formed by means of a first camera arranged above the feed conveyor, using a control-and-monitoring unit to identify a parcel to be separated having a gripping face on the top of the parcel not covered by any other parcel in said digital image of the unsorted parcel, configuring said control-and-monitoring unit to servo-control a gripper robot with suction cups comprising a gripper hand with a palm from which said suction cups extend so as to grasp by suction said parcel to be separated identified in the digital image and to deposit it said parcel on the sorting conveyor, locating said gripper robot is-above said parcel to be separated and before gripping said parcel, forming a digital image of the gripping face of said parcel to be separated by means of a second camera arranged in the palm of the hand between the suction cups of said gripper robot while the gripper robot is moving for gripping and configuring the control-and-monitoring unit to identify the presence or absence of an indication of the presence of sorting information in said digital image of the gripping face of the parcel and to servo-control the gripper robot in order to respectively move the parcel from the feed conveyor directly onto the sorting conveyor or to deposit the parcel from the feed conveyor onto a parcel turning device designed to turn over and deposit the parcel onto the sorting conveyor.

2. The method for feeding parcels according to claim 1, wherein the unsorted parcel is briefly illuminated when the digital image of the parcel to be separated is formed by the second camera using a pulsed lighting system controlled by the control-and-monitoring unit and arranged in the palm of the hand between the suction cups and around the camera of said gripper robot.

3. The method for feeding parcels according to claim 1, wherein the identification of the presence of sorting information is deduced by the control-and-monitoring unit from the direct detection of a destination address or from the detection of a graphic indication of the presence of a destination address on said gripping face, such as a commercial logo.

4. The method for feeding parcels according to claim 2, wherein the identification of the presence of sorting information is deduced by the control-and-monitoring unit from the direct detection of a destination address or from the detection of a graphic indication of the presence of a destination address on said gripping face, such as a commercial logo.

* * * * *